United States Patent Office 3,548,497
Patented Dec. 22, 1970

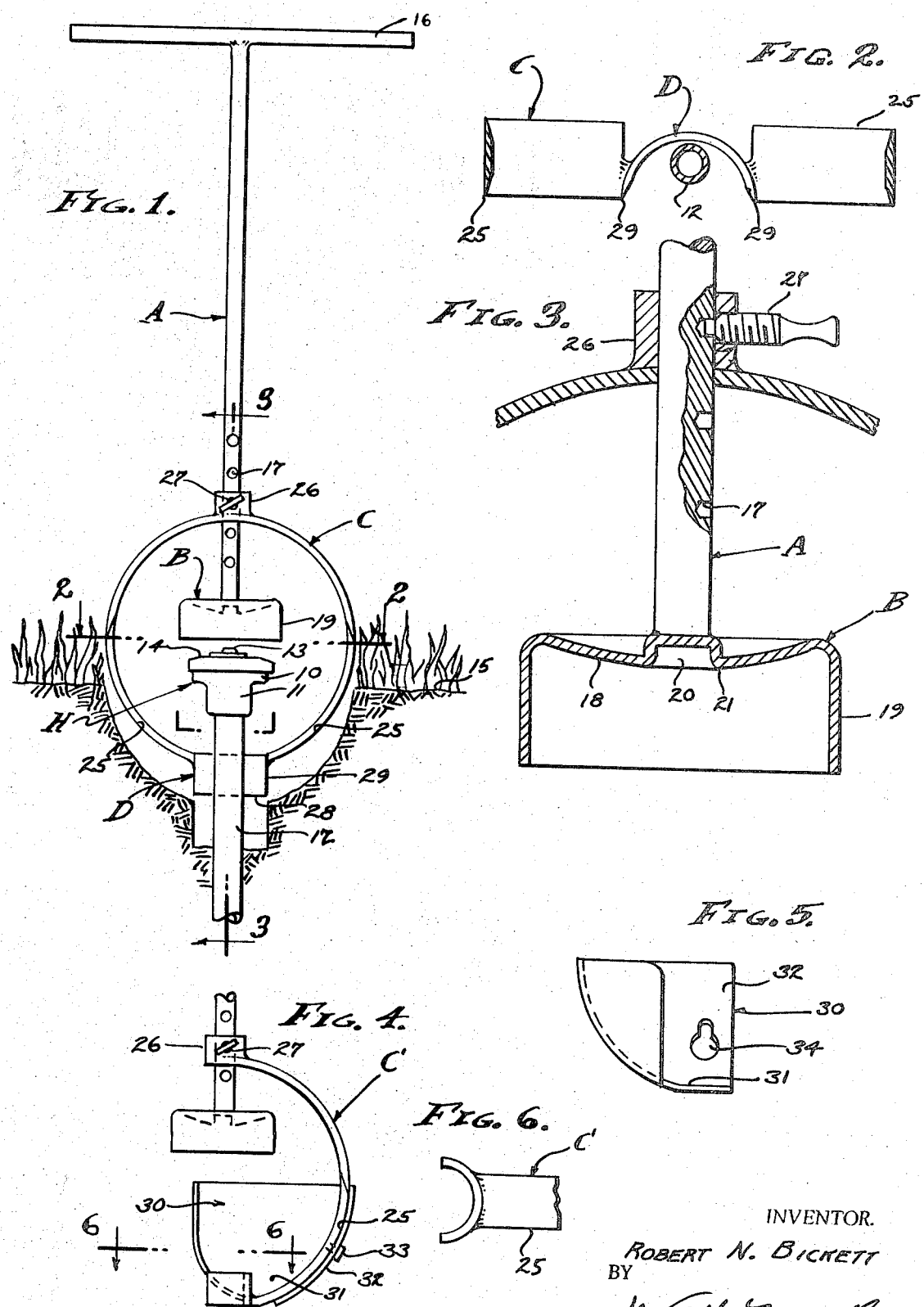

3,548,497
DIGGER AND LAWN TRIMMER FOR
SPRINKLER HEADS
Robert N. Bickett, 2462 Monogram Ave.,
Long Beach, Calif. 90815
Filed Apr. 12, 1968, Ser. No. 721,012
Int. Cl. A01b 45/04
U.S. Cl. 30—300
21 Claims

ABSTRACT OF THE DISCLOSURE

The invention involves a manually operable shaft that carries a sprinkler head engageable locator and centering means, and a cutter adjustable on the shaft and that carries a cutter-guide. The tool is operated by engaging the cutter and cutter-guide over the sprinkler head to be trimmed, with the locator and centering means over said head and with the cutter-guide bearing against the nipple or pipe support beneath the sprinkler head, and by revolving the shaft while pressing the tool into the ground to cut out a cave and simultaneously trim grass at the perimeter thereof.

---

The grooming of lawns at and around sprinkler heads is ordinarily a time consuming activity without a tool or implement for the specific purpose. Consequently, the caving and/or trimming around sprinkler heads is usually accomplished through the appropriate use of and manipulation of a spade or trowel, and through the additional use of clippers or scissors. Further, uniformity of such caves and trimming is dependent upon skill and it is unlikely that uniformity can be attained. Therefore, the present invention is directed to the uniform establishment of caves and trimming at and around sprinkler heads, with adjustment as to the depth and diameter and to the end that a person operating the tool stands substantially erect without the necessity of stooping.

An object of this invention is to provide a tool of the character hereinabove referred to that digs a cave of predetermined size at and surrounding a sprinkler head. With the present invention there is a cutter which upon operation of the tool is located and centered in relation to the sprinkler head to then be revolved for cutting both a cave and any grass or vegetation at the perimeter of the cave.

Another object of this invention is to provide a tool of the character referred to that is adjustable as to the size and depth of the cave to be established. With the present invention the size and depth are proportionately adjustable and to the end that uniformity of operation in selecting is selectively obtainable as circumstances require.

It is still another object of this invention to provide means in a tool of the character referred to that is operable to remove dirt from the cave that has been established, with the provision therein of an attachment facilitating lifting of dirt out of the cave.

The various objects and features of this invention will be fully understood from the following detailed description of the typical preferred forms and applications thereof, throughout which description reference is made to the accompanying drawings, in which:

FIG. 1 is an illustration of the tool or implement of the present invention in operative position over a sprinkler head, to form a cave and to trim the perimeter thereof.

FIGS. 2 and 3 are enlarged detailed views taken substantially as indicated by lines 2—2 and 3—3 on FIG. 1.

FIG. 4 is a view similar to a portion of FIG. 1 and shows a modified form of the invention.

FIG. 5 is an enlarged view taken of the dirt catching part appended to the tool of FIG. 4 and taken as indicated by line 5—5 on FIG. 4, and FIG. 6 is an enlarged fragmentary view taken as indicated by line 6—6 on FIG. 4.

This invention relates to the grooming of lawns at and around sprinkler heads H as they are ordinarily installed for watering. A tool or implement is provided which is manually operable to dig a cave surrounding a sprinkler head and to simultaneously trim the lawn at the perimeter of said cave. Further, the tool is adjustable to all sprinkler heads of standard size and dimension. To these ends the invention involves, generally, a shaft A, a locator and centering means B, a cutter C and a cutter-guide D. The shaft A is manually operable to be revolved with its axis disposed substantially normal to the ground, and the shaft carries the locator and centering means B at its lower end for engagement on and with the sprinkler head. The cutter C is selectively adjustable to be fixed along the lower portion of the shaft A and it is shaped to establish the configuration of the cave, whether large and deep or small and shallow. The cutter-guide D is carried by the cutter C and follows along the nipple or pipe that supports the sprinkler head H simultaneously clearing dirt away therefrom.

Primarily, it is sprinkler heads H and the like that are to be cleared around and such a head is shown in FIG. 1 of the drawings. Although sprinkler head installations vary in type and size, the overall bulk of the usual installations remain uniform within an expected range of size and configuration. That is, the diameter, height and nozzle details remain about the same, and the support of such heads upon vertically disposed nipples of nominal sized pipe is usually the same. These are the common variations and most of which are compensated for as hereinafter described, it being understood that commercial sized sprinkler heads, for example, will require a tool of somewhat larger configuration. As shown, the sprinkler head H involves a body 10 having a depending sleeve 11 threaded onto a vertically disposed nipple 12. Consequently, the axis of the sprinkler head is vertically disposed and accordingly the nozzle 13 is centered at the top face 14. In practice, the face 14 is at or close to the plane 15 of the lawn, or ground level, but this placement can vary greatly and all of which requires the adjustment feature and all to the end that a neat and uniform removal of dirt and trimming of grass can be executed on varieties of sprinkler head installations.

The shaft A that carries the locator and centering means B is an elongated element that is straight and preferably round. At its upper end it carries a handle 16, an integral T-shaped handle that is manually engageable to depress and to revolve the shaft. For adjustability of the cutter C, as later described, the shaft A has a series of aligned and incrementally spaced openings 17. In practice the shaft is solid and of rather small diameter, and the openings 17 are cylindrically drilled holes of limited depth.

The locator and centering means B that engages with the sprinkler head H is a downwardly faced element that embraces the sprinkler head and that stops or rests thereupon. The locator and centering means B can vary in form and is preferably an inverted cup-shaped member having a downwardly faced disc-shaped wall 18 with a depending cylindrical peripheral wall 19. The means B can be formed of sheet metal welded or otherwise secured concentrically on the terminal end of the shaft A. In accordance with the invention, the wall 18 extends downwardly and inwardly from the wall 19 with a central opening 20 that forms a recess or chamber for the reception of the nozzle 13. Thus, there is a centered ring-shaped pressure point 21 immediately adjacent to and surrounding the opening 20, and which bears against the top 14 of the sprinkler head H without transferring with the nozzle 13. Wall 17 substantially clears the outer diameter of head H so as to be free to rotate therearound.

The cutter C that is fixed to the shaft to establish the configuration of the cave is carried laterally of the shaft A at and beyond the lower terminal end and locator and centering means B. In practice, the cutter C either partially or completely embraces the terminal end of shaft A and the means B carried thereon, and is adjustable on the shaft A so as to selectively place the active cutter portions relative to the means B for the advantage of its locating and centering functions. In FIGS. 1–3 an all embracing cutter C is shown, and in FIG. 5 a partially embracing cutter C' is shown. In either form of the invention the cutter C or C' is effective to cut and trim an upwardly disposed concaved cave, the diameter and depth of which depends upon the adjusted location of the cutter. It is preferred that the cave be hemispherically formed in which case the active cutter portions, at least, correspondingly arcuate in formation. Characteristically therefore, the cutter C is of circular form while the cutter C' is of semicircular form. As shown, the cutters C and C' are bands of spring steel disposed flat in a spherical plane and with one or both edges 25 sharpened below the horizontal.

Referring to adjustability of the cutter C or C' the cutter is carried on the shaft A by a sliding collar 26, the cutter being welded to the collar and the collar freely passing the shaft A. For positive adjustable placement and driving engagement on and with the shaft, the collar is provided with a dog-point set screw 27 with its point bearable into the selected opening 17. Thus, the terminal end of shaft A and the locator and centering means B are adjustably positioned within the embraced confines of the cutter C or C' as the case may be.

Referring now to the cutter-guide D it is to be observed from FIGS. 1 and 2 that the pipe nipple 12 below the sprinkler head must be accommodated, but without adverse effect upon the cutting action. In accordance with the invention, the cutter C or C' is interrupted and stops short of the center axial portion or area of the tool, and the nipple 12 is circumvented by the cutter-guide D that continues transversely between or from the cutter. In either case the cutter-guide projects close by the nipple 12 to bear against the same as the tool revolves, and the lowermost and exposed edges 28 and 29 thereof are sharpened so as to cut and/or scrape out the cave immediate to the said nipple. For example, the cutter-guide D is an arcuate strap of cutting material with its inner concavity disposed so as to engage flat against the nipple, and in the first form welded to the opposed ends of the cutter C, and in the second form welded to the free end of the cutter C'.

Referring now to the facility for collecting and lifting dirt from the cave, FIGS. 4 and 5 illustrate a bucket 30 that is removably attached to the cutter C' (or C). Bucket 30 is formed with a semispherical bottom 31 notched to locate on or with the cutter-guide D, and it has a back 32 for collection of materials dug. Attachment of the bucket 30 is accomplished with a headed pin 33 which slideably receives the bottom 31 through a slot 34 having an enlargement to initially pass the head of said pin. The arcuate formation of the parts is used to advantage to create frictional engagement for securing the parts in the assembled condition.

From the foregoing it will be seen that a very practical and durable tool is provided for the useful purpose of digging out caves around sprinkler heads and simultaneously trimming the grass away from said heads. The action of the tool is adjustable to the end that the depth and diameter of the cave can be gaged as may be required. That is, it is a simple matter to raise and/or lower the cutter C relative to the shaft A and the locator and centering means B, and securing all of said elements together by tightening the set screw 27 into the selected locating hole 17. Thus, the lower active portion of the cutter C or C' is limited in its travel to a predetermined depth and to a correspondingly predetermined diameter, the tool being activated to dig and trim through turning of the shaft A by manipulation of the handle 16. Due to the circular shape of the cutter C or C', any nominal form vertical disposition of the tool has little or no effect upon the configuration of the cave that is dug, the locator and centering means B being positioned at the mean center of the concavity that is being dug. Further, in the event that the accumulation of earth is substantial and must be removed, then the bucket 30 is attached and follows the cutter C' (or C) and the tool manipulated to shovel out the debris as it is collected in said bucket. Consequently, any collections whether new or old can be removed with facility, as the cave is cut, recut and/or the grass trimmed therearound as circumstances require.

Having described only the typical preferred forms and applications of my invention, I do not wish to be limited or restricted to the specific details herein set forth, but wish to reserve to myself any modifications or variations that may appear to those skilled in the art.

Having described my invention, I claim:

1. A digger for excavating caves in the ground around and beneath sprinkler heads and the pipe supports therefor while simultaneously cutting away vegetation at the perimeter of the cave that is dug, and including, a shaft operable on an axis to be revolved and disposed normal to the ground with a lower terminal end over a sprinkler head, a locator and centering means carried on the lower terminal end of the shaft with a downwardly disposed stop means engageable against the sprinkler head and with a depending centering means embracing the sprinkler head to align therewith, a fixedly positioned cutter projecting laterally from the shaft above the said locator and centering means, said cutter having a downwardly and inwardly extended cutting portion partially embracing and terminating beneath and spaced from the said locator and centering means and away from the axis of rotation to clear the sprinkler head and support therefor, and a cutter-guide carried by the terminal end of the cutter and extending transversely adjacent to the axis of rotation to bear beneath the sprinkler head and against the support therefor.

2. The digger and lawn trimmer as set forth in claim 1 and wherein the shaft is manually operable and carries a handle at an upper terminal end thereof.

3. The digger and lawn trimmer as set forth in claim 1 wherein the stop means of the locator and centering means comprises a downwardly faced wall to stop against the sprinkler head.

4. The digger and lawn trimmer as set forth in claim 1 wherein the stop means of the locator and centering means comprises a downwardly and inwardly faced wall with a centered pressure point to stop against the sprinkler head.

5. The digger and lawn trimmer as set forth in claim 1 wherein the stop means of the locator and centering means comprises a downwardly and inwardly faced wall with a central opening therein to clear the central features of the sprinkler head and with a ring-shaped pressure point at and surrounding said opening to stop against the sprinkler head.

6. The digger and lawn trimmer as set forth in claim 1 wherein the centering means of the locator and centering means comprises a depending wall to embrace and align with the sprinkler head.

7. The digger and lawn trimmer as set forth in claim 1 wherein the centering means of the locator and centering means comprises a depending cylindrical wall to surround and align the sprinkler head.

8. The digger and lawn trimmer as set forth in claim 1 wherein the cutter is adjustably fixed to the shaft by means of a collar integral therewith and slideable on the shaft with means to set the collar in fixed relation to the shaft.

9. The digger and lawn trimmer as set forth in claim 1 wherein the cutter is adjustably fixed to the shaft by means of a collar integral therewith and slideable on the shaft with a set screw having a point operable into one of a series of openings spaced longitudinally of the shaft to set the collar in fixed relation to the shaft.

10. The digger and lawn trimmer as set forth in claim 1 wherein the cutter-guide is an arcuate strap extending transversely from the terminal end of the cutter and with an inner concavity to bear beneath the sprinkler head and flat against the support therefor.

11. The digger and lawn trimmer as set forth in claim 1 wherein a bucket is carried by the cutter to collect debris loosened by said cutter.

12. A digger for excavating caves in the ground around and beneath sprinkler heads and the pipe support therefor while simultaneously cutting away vegetation at the perimeter of the cave that is dug, and including, a shaft operable on an axis to be revolved and disposed normal to the ground with a lower terminal and over a sprinkler head, a locator and centering means carried on the lower terminal end of the shaft with a downwardly disposed stop means engageable against the sprinkler head and with a depending centering means embracing the sprinkler head to align therewith, a circular and fixedly positioned cutter on the shaft and disposed in a plane through the axis and fully embracing the said locator and centering means, the cutter comprising opposite downwardly and inwardly extended cutting portions terminating beneath and spaced from said locator and centering means and each with an end terminating away from the axis of rotation to clear the sprinkler head and support therefor, and a cutter-guide carried by and extending transversely between the ends of said terminating cutter portions and adjacent to the axis of rotation to bear beneath the sprinkler head and against the support therefor.

13. The digger and lawn trimmer as set forth in claim 12 and wherein the cutter-guide is an arcuate strap extending transversely between the ends of said terminating cutter portions and with an inner concavity to bear beneath the sprinkler head and flat against the support therefor.

14. The digger and lawn trimmer as set forth in claim 12 wherein the cutter is adjustably fixed to the shaft by means of a collar integral therewith and slideable on the shaft with means to seat the collar in fixed relation to the shaft.

15. The digger and lawn trimmer as set forth in claim 12 and wherein the cutter is adjustably fixed to the shaft by means of a collar integral therewith and slideable on the shaft with a set screw having a joint operable into one of a series of openings spaced longitudinally of the shaft to set the collar in fixed relation to the shaft.

16. The digger and lawn trimmer as set forth in claim 1 wherein the cutter-guide has circumferentially disposed and sharpened edges to cut the ground immediate to the said support.

17. The digger and lawn trimmer as set forth in claim 1 wherein the cutter-guide has circumferentially disposed and lowermost edges sharpened to cut the ground immediate to said support.

18. The digger and lawn trimmer as set forth in claim 1 wherein the cutter-guide is an arcuate strap extending transversely from the terminal end of the cutter and with an inner concavity to bear beneath the sprinkler head and flat against the support therefor and with sharpened edges engaging the ground to cut the same immediate to said support.

19. The digger and lawn trimmer as set forth in claim 12 wherein the cutter-guide has circumferentially disposed and sharpened edges to cut the ground immediate to the said support.

20. The digger and lawn trimmer as set forth in claim 12 wherein the cutter-guide has circumferentially disposed and lowermost edges sharpened to cut the ground immediate to said support.

21. The digger and lawn trimmer as set forth in claim 12 wherein the cutter-guide is an arcuate strap extending transversely between the ends of said terminating cutter portions and with an inner concavity to bear beneath the sprinkler head and flat against the support therefor and with sharpened edges engaging the ground to cut the same immediate to said support.

References Cited

UNITED STATES PATENTS

| | | | |
|---|---|---|---|
| 1,480,151 | 1/1924 | Cosman | 172—19X |
| 1,528,157 | 3/1925 | Leyden | 30—310X |
| 2,670,537 | 3/1954 | Campbell | 30—300 |
| 2,737,104 | 3/1956 | Edwards | 172—18 |
| 2,764,926 | 10/1956 | Heimbigner | 30—310X |
| 3,062,299 | 11/1962 | Koepfinger | 30—287X |

ROBERT C. RIORDON, Primary Examiner

J. C. PETERS, Assistant Examiner

U.S. Cl. X.R.

172—19